J. P. MORRIS.
Curtain Roller and Bracket.
No. 201,621. Patented March 26, 1878.
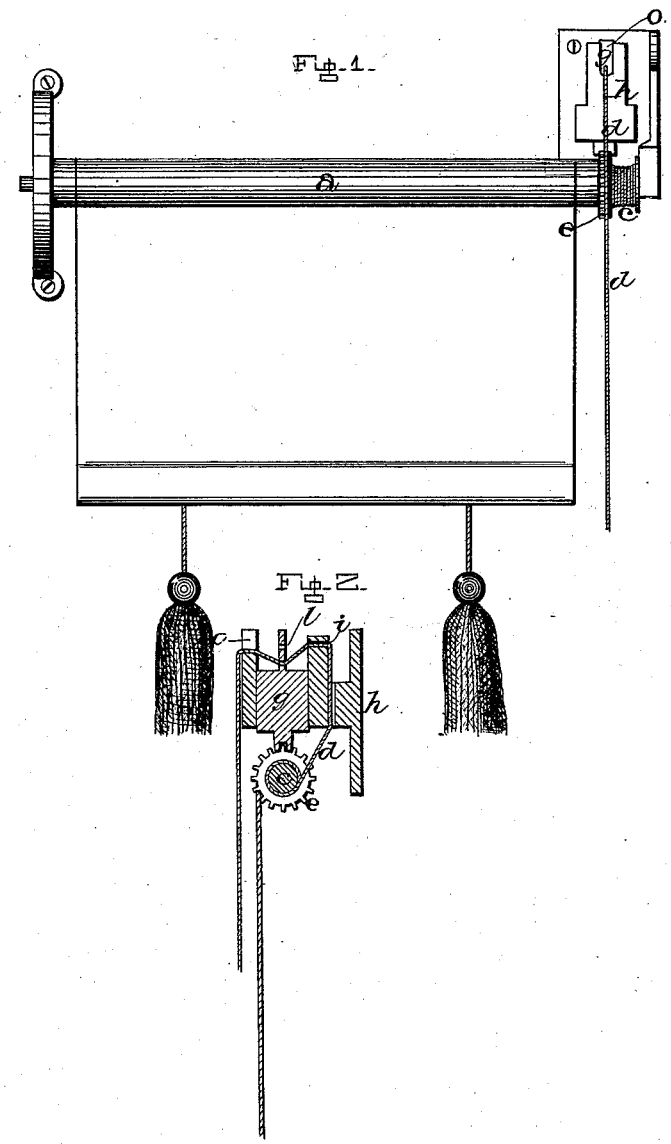

UNITED STATES PATENT OFFICE.

JAMES P. MORRIS, OF PARIS, TEXAS.

IMPROVEMENT IN CURTAIN-ROLLERS AND BRACKETS.

Specification forming part of Letters Patent No. 201,621, dated March 26, 1878; application filed February 1, 1878.

*To all whom it may concern:*

Be it known that I, JAMES P. MORRIS, of Paris, in the county of Lamar and State of Texas, have invented certain new and useful Improvements in Curtain-Fixtures; and I do hereby declare the following to be a full, clear, and exact description of the invention, such as will enable others skilled in the art to which it pertains to make and use it, reference being had to the accompanying drawings, which form part of this specification.

My invention relates to an improvement in curtain fixtures; and it consists in the arrangement and combination of parts that will be more fully described hereinafter, whereby a cheap, simple, and effective fixture is produced, and one which can be applied to either the inside or outside of the frame.

The accompanying drawings represent my invention.

$a$ represents the curtain-roller, which is journaled in suitable bearings at each end, and will be made to unwind by the weight that is attached to the bottom of the curtain. Upon one end is formed the pulley $c$, upon which the cord $d$ is wound as the curtain descends, and just to one side of this pulley are formed the teeth or projections $e$, with which the vertically-moving stop $g$ engages, so as to prevent the roller $a$ from revolving in either direction until the cord is pulled.

One end of the cord is fastened to the pulley $c$, then passes up through the bearing or frame $h$, forward through the hole $i$, through a hole in the top of the stop $q$, and forward through a notch, $o$, in the front part of the frame. The bottom of this notch $o$ and the hole $i$ are just about on the same level, while the hole through the top of the stop is made lower down. As soon as a downward pull is made upon the cord the stop is raised upward by the string, so as to release its lower end from the teeth $e$, when the roller is free to turn. The descent of the curtain winds up the cord upon the pulley, so that when the curtain is down a continued pull upon the cord first raises the stop, and then causes the roller to revolve, so as to raise the curtain. When the curtain is up, a pull upon the cord raises the stop, when the curtain descends by its own weight.

The fixture above described can be applied to either the inside or outside of the frame.

Having thus described my invention, I claim—

The combination of the roller $a$, pulley $c$, and toothed wheel $e$ with the frame $h$, having holes for the passage of the cord $d$, and weight $g$, provided with a hole, $l$, and teeth to catch in the wheel to lock the roller in position, substantially as shown.

In testimony that I claim the foregoing I have hereunto set my hand this 19th day of January, 1878.

JAMES P. MORRIS.

Witnesses:
J. F. HOOKS,
J. C. MOORE.